(12) United States Patent
Shao et al.

(10) Patent No.: US 11,841,710 B2
(45) Date of Patent: *Dec. 12, 2023

(54) AUTOMATIC WORKING SYSTEM, SELF-MOVING DEVICE, AND METHODS FOR CONTROLLING SAME

(71) Applicant: Positec Power Tools (Suzhou) Co., Ltd., Jiangsu (CN)

(72) Inventors: Yong Shao, Suzhou (CN); Mingming He, Suzhou (CN); Chang Zhou, Suzhou (CN); Zhou Yang, Suzhou (CN); Gen Sun, Suzhou (CN); Yue Rao, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,503

(22) Filed: Sep. 13, 2022

(65) Prior Publication Data

US 2023/0004172 A1 Jan. 5, 2023

Related U.S. Application Data

(63) Continuation of application No. 16/157,906, filed on Oct. 11, 2018, now Pat. No. 11,442,466, which is a (Continued)

(30) Foreign Application Priority Data

Apr. 12, 2016 (CN) .......................... 201610224652.2
Sep. 6, 2016 (CN) .......................... 201610805198.X

(51) Int. Cl.
*G05D 1/02* (2020.01)
*G01S 1/00* (2006.01)
(Continued)

(52) U.S. Cl.
CPC .............. *G05D 1/0278* (2013.01); *G01S 1/00* (2013.01); *G01S 19/485* (2020.05); *G01S 19/49* (2013.01);
(Continued)

(58) Field of Classification Search
CPC .. G05D 1/0278; G05D 1/0088; G05D 1/0231; G05D 1/0257; G05D 1/0259;
(Continued)

(56) References Cited

U.S. PATENT DOCUMENTS 11,442,466 B2 * 9/2022 Shao ................... G05D 1/0257
2004/0230374 A1 11/2004 Tzamaloukas
(Continued)

FOREIGN PATENT DOCUMENTS

CN 101126808 A 2/2008
CN 102913275 A 2/2013
(Continued)

OTHER PUBLICATIONS

European Search Report for App. No. 17 781 905.9 dated Nov. 4, 2019, 9 pages.
(Continued)

*Primary Examiner* — Donald J Wallace
(74) *Attorney, Agent, or Firm* — Dentons US LLP

(57) ABSTRACT

A self-moving device, including: a moving module, a task execution module, a control module. The control module is electrically connected to the moving module and the task execution module, controls the moving module to actuate the self-moving device to move, controls the task execution module to execute a working task. The self-moving device further includes a satellite navigation apparatus, electrically connected to the control module and configured to receive a satellite signal and output current location information of the self-moving device. The control module determines whether
(Continued)

quality of location information output by the satellite navigation apparatus at a current location satisfies a preset condition, controls, if the quality does not satisfy the preset condition, the moving module to actuate the self-moving device to change a moving manner, to enable quality of location information output by the satellite navigation apparatus at a location after the movement to satisfy the preset condition.

22 Claims, 10 Drawing Sheets

Related U.S. Application Data continuation of application No. PCT/CN2017/080313, filed on Apr. 12, 2017.

(51) Int. Cl.
  *G01S 19/49* (2010.01)
  *G01S 19/48* (2010.01)
  *G05D 1/00* (2006.01)
(52) U.S. Cl.
  CPC .......... *G05D 1/0088* (2013.01); *G05D 1/027* (2013.01); *G05D 1/028* (2013.01); *G05D 1/0231* (2013.01); *G05D 1/0257* (2013.01); *G05D 1/0259* (2013.01); *G05D 1/0225* (2013.01); *G05D 2201/0208* (2013.01)
(58) Field of Classification Search
  CPC ...... G05D 1/027; G05D 1/028; G05D 1/0225; G05D 2201/0208; G05D 1/0285; G01S 1/00; G01S 19/485; G01S 19/49; G01C 21/00

See application file for complete search history.

(56) References Cited

U.S. PATENT DOCUMENTS

| | | |
|---|---|---|
| 2009/0030551 A1 | 1/2009 | Hein et al. |
| 2010/0274434 A1 | 10/2010 | Donnelli et al. |
| 2013/0211711 A1 | 8/2013 | Kelly et al. |
| 2013/0218397 A1 | 8/2013 | Griffini et al. |
| 2014/0149032 A1 | 5/2014 | Barrett et al. |
| 2014/0335893 A1 | 11/2014 | Ronen |
| 2015/0312774 A1 | 10/2015 | Lau |
| 2016/0061957 A1 | 3/2016 | Li et al. |
| 2016/0297070 A1 | 10/2016 | Reigo et al. |
| 2017/0150371 A1 | 5/2017 | Cichonski |
| 2017/0292840 A1 | 10/2017 | Sorenson et al. |
| 2018/0215393 A1 | 8/2018 | Miyakubo et al. |
| 2019/0041869 A1 | 2/2019 | Shao et al. |

FOREIGN PATENT DOCUMENTS

| | | |
|---|---|---|
| CN | 104184781 A | 12/2014 |
| WO | 2015072897 A1 | 5/2015 |

OTHER PUBLICATIONS

State Intellectual Property Office of the P.R. China, International Search Report and Written Opinion for PCT/CN2017/080313 dated Jun. 28, 2017, 9 pages.

* cited by examiner

AUTOMATIC WORKING SYSTEM, SELF-MOVING DEVICE, AND METHODS FOR CONTROLLING SAME

BACKGROUND

Technical Field

The present invention relates to an automatic working system, a self-moving device, and methods for controlling same.

Related Art

With the development of science and technologies, self-moving devices are well-known to people. Because the self-moving devices can execute preset relevant tasks according to automatically preset programs without being manually operated or intervened, they are widely applied to industrial and household products. In industrial application such as robots implementing various functions and in application to household products such as mowers and vacuum cleaners, the self-moving devices greatly save people's time and bring great convenience to industrial production and home life.

SUMMARY

An automatic mower is a most common household product that can be used to automatically execute a mowing task to mow a lawn and keep the lawn clean and beautiful. When the automatic mower is executing a mowing task, GPS navigation (including differential global positioning system (DGPS) navigation) is usually used, and as the BeiDou system becomes mature in the future, BeiDou signal navigation may alternatively be used. However, as shown in FIG. 1, when an automatic mower travels alongside an obstacle such as a fence/a tree/flowers, because of blocking, a GPS signal is relatively poor, and in this case, if GPS navigation continues to be used, the navigation is basically "blind navigation" and would cause a relatively large error. If the automatic mower is instructed to stop working and perform computation for a long time in situ to obtain accurate coordinates, computation software and hardware are complex, and device costs are increased. Meanwhile, if a device stops and does not move within a period of time, a user may have a misconception that the device is faulty, and it is disadvantageous to promotion and popularization of the device. In this case, the automatic mower may alternatively use an inertial navigation system carried thereon to perform navigation. However, it could be learned from a working principle of the inertial navigation system (a working principle of inertial navigation is based on Newton's laws of mechanics, and is measuring acceleration of a carrier in an inertial reference system, performing integration on time by using the acceleration, and converting the acceleration into a navigation coordinate system, so as to obtain information, such as a velocity, a yaw angle, and a location, in the navigation coordinate system) that the inertial navigation system is a calculation navigation manner, where as time extends, its precision is certainly reduced, and this is disadvantageous to long-time working of the automatic mower.

In the differential global positioning system (DGPS), a monitoring receiver is mounted at a precise known location to calculate a range error of each GPS satellite that can be tracked by the monitoring receiver. This error is usually referred to as a pseudo range correction (PRC) value, and the PRC value is transmitted to a user receiver for error correction, so as to improve positioning precision. Currently, a base station and a mobile station of the DGPS need to receive signals of at least four satellites together, so as to use a real-time kinematic (RTK) algorithm to implement precise positioning, and when there is blocking of an obstacle such as a house, and the base station and the mobile station cannot receive signals of at least four satellites together, there is a dead zone, and precise positioning cannot be performed.

Conventionally, a self-moving device is provided with a receive antenna of a mobile station of the DGPS, and a radio signal transmit antenna of a base station of the DGPS is usually disposed on a charging station of the self-moving device. However, because the charging station has a relatively small height, during a transmission process of a radio wave, the radio wave may encounter an obstacle such as a house, resulting in signal attenuation, and particularly, when the self-moving device travels beside an obstacle, the base station of the DGPS basically cannot perform data communication with a receiving station on the self-moving device. Consequently, precision of positioning of the DGPS is greatly reduced.

When precision of positioning of the DGPS is greatly reduced, that is, the self-moving device travels beside an obstacle or into a signal dead zone, the self-moving device cannot accurately learn of its location. Therefore, when there is no borderline, the self-moving device may travel to a dangerous area, resulting in damage to the self-moving device.

The embodiments of the present invention provide: a self-moving device, comprising:

a moving module, a task execution module, and a control module, wherein the control module is electrically connected to the moving module and the task execution module, controls the moving module to actuate the self-moving device to move, and controls the task execution module to execute a working task; and the self-moving device further comprises a satellite navigation apparatus, electrically connected to the control module and configured to receive a satellite signal and output current location information of the self-moving device, wherein the control module determines whether quality of location information output by the satellite navigation apparatus at a current location satisfies a preset condition, and controls, if the quality does not satisfy the preset condition, the moving module to actuate the self-moving device to change a moving manner, to enable quality of location information output by the satellite navigation apparatus at a location after the movement to satisfy the preset condition.

In one of the embodiments, the self-moving device comprises a storage unit, electrically connected to the control module and the satellite navigation apparatus; a location at which quality of location information output by the satellite navigation apparatus satisfies the preset condition is referred to as an expected location; the storage unit stores information of the expected location; and that the control module controls the moving module to actuate the self-moving device to change a moving manner comprises controlling the moving module to actuate the self-moving device to move toward the expected location.

In one of the embodiments, the control module determines distances between several expected locations stored in the storage unit and the current location of the self-moving device, chooses one of the several expected locations according to the distances between the expected locations and the current location of the self-moving device, and controls the moving module to actuate the self-moving device to move toward the chosen expected location.

In one of the embodiments, the control module controls the moving module to actuate the self-moving device to move toward an expected location closest to the current location of the self-moving device.

In one of the embodiments, a location at which the quality of the location information output by the satellite navigation apparatus does not satisfy the preset condition before the self-moving device changes the moving manner is referred to as an original location, and the storage unit stores information of the original location; and after the self-moving device moves to the expected location, the control module controls the moving module to actuate the self-moving device to return to the original location.

In one of the embodiments, before the control module controls the moving module to actuate the self-moving device to change the moving manner, the control module controls the moving module to actuate the self-moving device to move along a preset path; and after controlling the moving module to actuate the self-moving device return to the original location, the control module controls the moving module to actuate the self-moving device to continue to move along the preset path.

In one of the embodiments, before the control module controls the moving module to actuate the self-moving device to change the moving manner, the control module controls the moving module to actuate the self-moving device to move along a preset path; and after determining that the quality of the location information output by the satellite navigation apparatus at the current location does not satisfy the preset condition, the control module controls the moving module to actuate the self-moving device to continue to move along the preset path for a preset time or by a preset distance before the self-moving device changes the moving manner.

In one of the embodiments, the self-moving device further comprises at least one location sensor, electrically connected to the control module, and configured to detect features related to the location of the self-moving device; and when the quality of the location information output by the satellite navigation apparatus does not satisfy the preset condition, the control module determines the current location of the self-moving device at least partially based on output of the location sensor.

In one of the embodiments, the location sensor comprises at least one of a camera, radar, a capacitive sensor, and an inertial navigation sensor.

In one of the embodiments, when the quality of the location information output by the satellite navigation apparatus satisfies the preset condition, the self-moving device corrects the output of the location sensor by using output of the satellite navigation apparatus.

In one of the embodiments, the preset condition comprises that the quantity of satellites from which the satellite navigation apparatus receives a signal is greater than or equal to a preset value.

The embodiments of the present invention also provide an automatic working system, comprising the self-moving device according to any of the foregoing claims.

The embodiments of the present invention also provide a method for controlling a self-moving device, wherein the self-moving device comprises a satellite navigation apparatus, configured to receive a satellite signal and output current location information of the self-moving device, and the method for controlling a self-moving device comprises steps of:

determining whether quality of location information output by the satellite navigation apparatus at a current location satisfies a preset condition; and controlling, if the quality does not satisfy the preset condition, the self-moving device to change a moving manner, to enable quality of location information output by the satellite navigation apparatus at a location after the movement to satisfy the preset condition.

In one of the embodiments, a location at which quality of location information output by the satellite navigation apparatus satisfies the preset condition is referred to as an expected location; information of the expected location is stored; and changing a moving manner comprises a step of controlling the self-moving device to move toward the expected location.

In one of the embodiments, distances between several stored expected locations and the current location of the self-moving device are determined, one of the several expected locations is chosen according to the distances between the expected locations and the current location of the self-moving device, and the self-moving device is controlled to move toward the chosen expected location.

In one of the embodiments, the self-moving device is controlled to move toward an expected location closest to the current location of the self-moving device.

In one of the embodiments, a location at which the quality of the location information output by the satellite navigation apparatus does not satisfy the preset condition before the self-moving device changes the moving manner is referred to as an original location, and information of the original location is stored; and after the self-moving device is controlled to move to the expected location, the self-moving device is further controlled to return to the original location.

In one of the embodiments, before the self-moving device changes the moving manner, the self-moving device is controlled to move along a preset path; and after the self-moving device returns to the original location, the self-moving device is controlled to continue to move along the preset path.

In one of the embodiments, before the self-moving device changes the moving manner, the self-moving device is controlled to move along a preset path; and after it is determined that the quality of the location information output by the satellite navigation apparatus at the current location does not satisfy the preset condition, the self-moving device is controlled to continue to move along the preset path for a preset time or by a preset distance before the self-moving device changes the moving manner.

In one of the embodiments, the self-moving device further comprises at least one location sensor, configured to detect features related to the location of the self-moving device; and when the quality of the location information output by the satellite navigation apparatus does not satisfy the preset condition, the current location of the self-moving device is determined at least partially based on output of the location sensor.

In one of the embodiments, the location sensor comprises at least one of a camera, radar, a capacitive sensor, and an inertial navigation sensor.

In one of the embodiments, when the quality of the location information output by the satellite navigation apparatus satisfies the preset condition, the output of the location sensor is corrected by using output of the satellite navigation apparatus.

In one of the embodiments, the preset condition comprises that the quantity of satellites from which the satellite navigation apparatus receives a signal is greater than or equal to a preset value.

Compared with the prior art, beneficial effects of the present invention are: when a self-moving device moves to an area where a satellite navigation signal is poor, by changing a moving manner, the self-moving device can maintain high-precision navigation, and can implement coverage on the area where the satellite navigation signal is poor, so that the self-moving device can efficiently implement coverage on an entire working area.

The embodiments of the present invention further provide a method for navigating a self-moving device, including:

(1) detecting whether a self-moving device can receive a stable satellite navigation signal;

(2) if the self-moving device can receive a stable satellite navigation signal, proceeding to step (8);

(3) moving, by the self-moving device in an inertial navigation manner, from a current location along a preset working direction S for a preset time period T, and recording corresponding location coordinates of the self-moving device after the movement;

(4) detecting whether the self-moving device can receive a stable satellite navigation signal;

(5) if the self-moving device can receive a stable satellite navigation signal, proceeding to step (8);

(6) moving, by the self-moving device in the inertial navigation manner, along a preset direction S1 for a preset time period T1 from the location coordinates of the self-moving device after the self-moving device moves along the working direction S for the preset time period T, where after moving along the preset direction S1 for the preset time period T1, the self-moving device can receive a stable satellite navigation signal;

(7) controlling, in a satellite navigation manner, the self-moving device to return along a direction opposite to the preset direction S1 to the location coordinates of the self-moving device after the self-moving device moves along the preset working direction S for the preset time period T, where postures of the self-moving device before and after the movement are the same, and proceeding to step (3); and (8) controlling, by the self-moving device in the satellite navigation manner, the self-moving device to move along the preset working direction S until the self-moving device completes a working task.

In the foregoing method for navigating a self-moving device, when a satellite navigation signal cannot be received, a manner of alternating inertial navigation and satellite navigation may be adopted to ensure correctness of a path during working of the self-moving device, thereby improving navigation precision and reducing a navigation error.

In one of the embodiments, a sum of the preset time periods T and T1 is less than a time during which the self-moving device can maintain high-precision positioning of inertial navigation.

In one of the embodiments, an angle between the preset direction S1 and the working direction S includes, but is not limited to, a 90-degree angle.

A self-moving device performing navigation by using the foregoing navigation method is provided, and includes a satellite navigation module and an inertial navigation module and further includes:

a detection module, configured to detect whether the satellite navigation module can receive a stable satellite navigation signal;

a first control module, configured to use, when the detection module detects that the satellite navigation module can receive a stable satellite navigation signal, the satellite navigation module to control the self-moving device to move along a preset working direction S or use, when the detection module detects that the satellite navigation module cannot receive a stable satellite navigation signal, the inertial navigation module to control the self-moving device to move from a current location along a preset working direction S for a preset time period T, and record corresponding location coordinates of the self-moving device after the movement;

a second control module, configured to use, when the detection module detects that the satellite navigation module can receive a stable satellite navigation signal, the satellite navigation module to control the self-moving device to move along the preset working direction S or use, when the detection module detects that the satellite navigation module cannot receive a stable satellite navigation signal, the inertial navigation module to control the self-moving device to move along a preset direction S1 for a preset time period T1, where after moving along the preset direction S1 for the preset time period T1, the self-moving device can receive a stable satellite navigation signal;

a third control module, configured to use the satellite navigation module to control the self-moving device to return along a direction opposite to the preset direction S1 to location coordinates of the self-moving device after the self-moving device moves along the preset working direction S for the preset time period T; and a main control module, configured to control the detection module, the first control module, the second control module, and the third control module to work.

When the foregoing self-moving device cannot receive a satellite navigation signal, a manner of alternating inertial navigation and satellite navigation may be adopted to ensure correctness of a path during working of the self-moving device, thereby improving navigation precision and reducing a navigation error.

In one of the embodiments, a sum of the preset time periods T and T1 is less than a time during which the self-moving device can maintain high-precision positioning of inertial navigation.

In one of the embodiments, an angle between the preset direction S1 and the working direction S includes, but is not limited to, a 90-degree angle.

In one of the embodiments, the first control module includes:

a first navigation unit, configured to use the satellite navigation module to control the self-moving device to move along the preset working direction S;

a second navigation unit, configured to use the inertial navigation module to control the self-moving device to move from the current location along the preset working direction S for the preset time period T; and a recording unit, configured to record corresponding location coordinates of the self-moving device after the movement and a posture of the self-moving device.

In one of the embodiments, the second control module includes:

a first control unit, configured to use the satellite navigation module to control the self-moving device to move along the preset working direction S; and a second control unit, configured to use the inertial navigation module to control the self-moving device to move along the preset direction S1 for the preset time period T1.

The present invention further provides a method for controlling traveling of a self-moving device, where a traveling area of the self-moving device includes a radio signal dead zone and a radio signal coverage area, and the method includes:

detecting the traveling area where the self-moving device is located when the self-moving device travels;

starting timing when the self-moving device is located in the radio signal dead zone;

when a time during which the self-moving device travels in the radio signal dead zone exceeds a first time threshold, controlling the self-moving device to move backward or turn and then continue to travel for a time of the first time threshold; and controlling the self-moving device to shut down and issue an alarm when the self-moving device is still in the radio signal dead zone after the self-moving device moves backward or turns and then continues to travel for the time of the first time threshold.

In one of the embodiments, the step of turning and then continuing to travel for a time of the first time threshold is: controlling the self-moving device to continue, after rotating a traveling direction by an angle, to travel for the time of the first time threshold, where the angle ranges from 0 degrees to 180 degrees.

In one of the embodiments, the radio signal coverage area includes a first radio signal coverage area and a second radio signal coverage area, where the strength of a radio signal of the first radio signal coverage area is higher than the strength of a radio signal of the second radio signal coverage area; and the method further includes:

starting timing when the self-moving device is located in the second radio signal dead zone; and controlling the self-moving device to travel toward the first radio signal coverage area when a time during which the self-moving device travels in the second radio signal coverage area exceeds a second time threshold.

In one of the embodiments, the step of controlling the self-moving device to travel toward the first radio signal coverage area includes:

obtaining a relative direction between a current location of the self-moving device and the first radio signal coverage area; and controlling, according to the relative direction, the self-moving device to travel toward the first radio signal coverage area.

In one of the embodiments, the method further includes:

when the self-moving device travels from the second radio signal coverage area to the radio signal dead zone, calculating a time during which the self-moving device is located in the second radio signal coverage area last time;

starting timing when the calculated time during which the self-moving device is located in the second radio signal coverage area last time does not exceed a third time threshold;

when a time during which the self-moving device travels in the radio signal dead zone exceeds a fourth time threshold, controlling the self-moving device to move backward or turn and then continue to travel for a time of a fifth time threshold, where the fourth time threshold is less than the first time threshold; and controlling the self-moving device to shut down and issue an alarm when the self-moving device is still in the radio signal dead zone after the self-moving device moves backward or turns and then continues to travel for the time of the fifth time threshold.

In one of the embodiments, the self-moving device is controlled to shut down and issue an alarm when the calculated time during which the self-moving device is located in the second radio signal coverage area last time exceeds the third time threshold and is less than the second time threshold.

A system for controlling traveling of a self-moving device is provided, where a traveling area of the self-moving device includes a radio signal dead zone and a radio signal coverage area, and the system includes:

a controller, configured to detect the traveling area where the self-moving device is located when the self-moving device travels;

a timer, connected to the controller, and configured to start timing when the self-moving device is located in the radio signal dead zone;

a steering, connected to the controller and configured to: when a time during which the self-moving device travels in the radio signal dead zone exceeds a first time threshold, control the self-moving device to move backward or turn, where after the self-moving device moves backward or turns, the controller is further configured to control the self-moving device to continue to travel for a time of the first time threshold; and an alarm, connected to the controller, and configured to control the self-moving device to shut down and issue an alarm when the self-moving device is still in the radio signal dead zone after the self-moving device moves backward or turns and then continues to travel for the time of the first time threshold.

In one of the embodiments, the steering includes:

an angle setting module, configured to set a rotation angle of the self-moving device, where the angle ranges from 0 degrees to 180 degrees; and a steering module, connected to the controller and the angle setting module, and configured to control the self-moving device to move backward or turn by the angle when the time during which the self-moving device travels in the radio signal dead zone exceeds the first time threshold.

In one of the embodiments, the radio signal coverage area includes a first radio signal coverage area and a second radio signal coverage area, where the strength of a radio signal of the first radio signal coverage area is higher than the strength of a radio signal of the second radio signal coverage area;

the timer is further configured to start timing when the self-moving device is located in the second radio signal dead zone; and the steering is further configured to control the self-moving device to travel toward the first radio signal coverage area when a time during which the self-moving device travels in the second radio signal coverage area exceeds a second time threshold.

In one of the embodiments, the controller is further configured to: when the self-moving device travels from the second radio signal coverage area to the radio signal dead zone, calculate a time during which the self-moving device is located in the second radio signal coverage area;

the timer is further configured to start timing when the calculated time during which the self-moving device is located in the second radio signal coverage area does not exceed a third time threshold;

the steering is further configured to: when a time during which the self-moving device travels in the radio signal dead zone exceeds a fourth time threshold, control the self-moving device to move backward or turn, where the fourth time threshold is less than the first time threshold; and after the self-moving device moves backward or turns, the controller is further configured to control the self-moving device to continue to travel for a time of a fifth time threshold; and the alarm is further configured to control the self-moving device to shut down and issue an alarm when the self-moving device is still in the radio signal dead zone after the self-moving device moves backward or turns and then continues to travel for the time of the fifth time threshold.

In one of the embodiments, the alarm is further configured to control the self-moving device to shut down and issue an alarm when the calculated time during which the self-moving device is located in the second radio signal coverage area last time exceeds the third time threshold and is less than the second time threshold.

According to the foregoing method and system for controlling traveling of the self-moving device, operation of the self-moving device is controlled by determining whether the self-moving device is located in the radio signal dead zone, so that when the self-moving device is in an area where positioning precision is poor such as a radio signal dead zone, the self-moving device can be prevented from traveling into a dangerous area, so as to prevent the self-moving device from being damaged.

BRIEF DESCRIPTION OF THE DRAWINGS

The foregoing objectives, technical solutions, and beneficial effects of the present invention can be achieved by using the following drawings.

DETAILED DESCRIPTION

Figure 1:
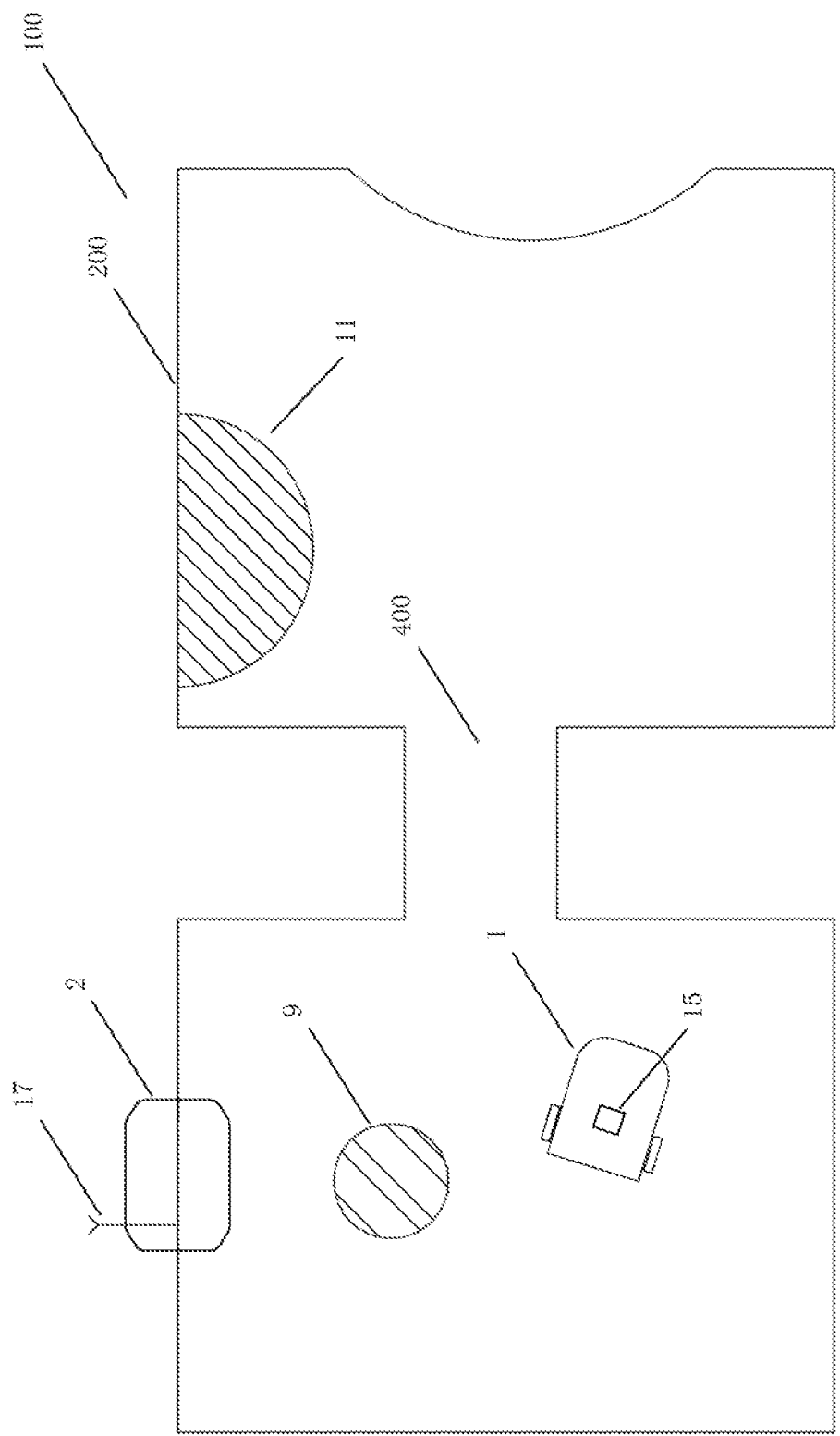
FIG. 1 is a schematic diagram of an automatic working system according to an embodiment of the present invention.

FIG. 1 is a schematic diagram of an automatic working system 100 according to an embodiment of the present invention. The automatic working system includes a self-moving device. In this embodiment, the self-moving device an automatic mower 1, in other embodiments, the self-moving device may alternatively be a device suitable for an unattended situation such as an automatic cleaning device, an automatic watering device, or an automatic snow sweeper. The automatic working system 100 further includes a charging station 2, configured to dock the automatic mower 1 and supplement electric energy. In this embodiment, the automatic working system 100 includes a navigation module, configured to output a current location of the automatic mower. Specifically, the navigation module includes a base station 17 and a mobile station 15. The base station 17 and the mobile station 15 both receive satellite signals, and the base station 17 sends a positioning correction signal to the mobile station 15, to implement differential satellite positioning. In this embodiment, the base station 17 and the mobile station 15 receive GPS positioning signals, to implement DGPS positioning. Certainly, in another embodiment, the base station 17 and the mobile station 15 may alternatively receive positioning signals of the Galileo satellite navigation system, the BeiDou satellite navigation system, or the GLONASS.

As shown in FIG. 1, the automatic working system is configured to work in a preset working area. In this embodiment, the working area includes at least two sub-working areas that are separate from each other, and the sub-working areas are connected through a channel 400. A border 200 is formed between the working area and a non-working area, the working area includes obstacles 9 and 11, and the obstacles include a tree, a pit, and the like.

Figure 2:
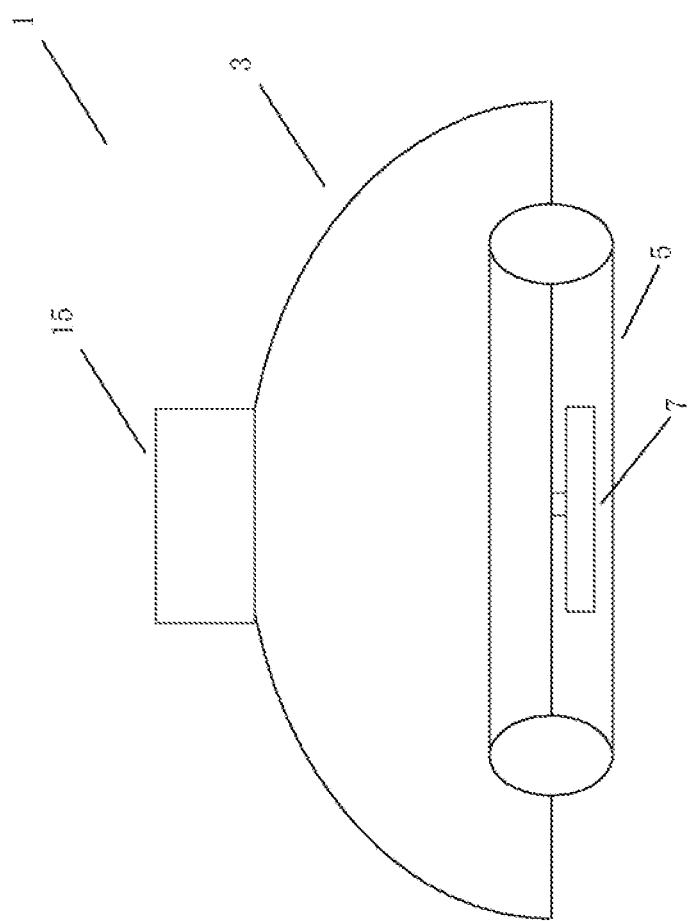
FIG. 2 is a schematic structural diagram of an automatic mower according to an embodiment of the present invention.

In this embodiment, the structure of the automatic mower 1 is shown in FIG. 2. The automatic mower 1 includes a housing 3, a moving module, a task execution module, an energy module, a control module, and the like. The moving module includes a track 5, driven by a driving motor to actuate the automatic mower 1 to move. The task execution module includes a mowing component 7, to perform lawn mowing work. The energy module includes a battery pack (not shown in the figure), to provide electric energy for moving and working of the automatic mower 1. The control module is electrically connected to the moving module, the task execution module, and the energy module, controls the moving module to actuate the automatic mower 1 to move, and controls the task execution module to execute a working task. In this embodiment, the automatic mower includes a satellite navigation apparatus, electrically connected to the control module, and configured to receive a satellite signal and output current location information of the automatic mower 1. The satellite navigation apparatus includes the foregoing mobile station 15.

Quality of location information output by the satellite navigation apparatus varies as a working environment changes. When the automatic mower is located in an open working area, the mobile station 15 can receive navigation signals of a plurality of satellites, and when communication between the mobile station 15 and the base station 17 is not blocked, the quality of the location information output by the satellite navigation apparatus is high. When the automatic mower is located in a shaded area, where the shaded area may be an area near a building or an area shaded by a tree or eaves, the mobile station 15 can only receive navigation signals of a few satellites or cannot receive a navigation signal of a satellite. Consequently, quality of location information output by the satellite navigation apparatus is degraded. In another case in which communication between the mobile station 15 and the base station 17 is blocked, quality of location information output by the satellite navigation apparatus is also degraded. When the satellite navigation apparatus outputs location information, it can output a precision level of a positioning signal. The automatic mower may alternatively determine a current positioning status according to the location information output by the satellite navigation apparatus and output a positioning status indication. A basis for determining the quality of the location information output by the satellite navigation apparatus may be the quantity of satellites from which the satellite navigation apparatus can receive a signal, or the positioning status indication, or a precision factor. Alternatively, various factors are combined, and importance weights are set, to obtain the quality of the location information. The quality of the location information output by the satellite navigation apparatus may be evaluated by the satellite navigation apparatus, and the control module obtains an evaluation result. Alternatively, evaluation may be performed by the control module by using output of the satellite navigation apparatus, to obtain an evaluation result.

In this embodiment, the automatic mower further includes at least one location sensor, electrically connected to the control module and configured to detect a feature related to a location of the automatic mower. The location sensor may include a camera, radar, a capacitive sensor, an inertial navigation sensor, or the like. In this embodiment, the location sensor is an inertial navigation sensor. The inertial navigation sensor may include an accelerometer, an odometer, a compass, a gyroscope, a posture detection sensor, and the like, to detect a velocity, acceleration, a traveling direction, and the like of the self-moving device. In this embodiment, when the quality of the location information output by the satellite navigation apparatus does not satisfy the preset condition, the control module determines the current location of the self-moving device at least partially based on output of the location sensor. Specifically, fusion processing may be performed on the location information output by the satellite navigation apparatus and the output of the location sensor, to obtain the current location of the automatic mower. Using an inertial navigation sensor as an example, if the inertial navigation sensor is continuously used to perform navigation, output of the inertial navigation sensor accumulates the error with the time, and consequently, precision of the output position information is reduced. Therefore, when the quality of the location information output by the satellite navigation apparatus satisfies the preset condition, the output of the location sensor is corrected by using output of the satellite navigation apparatus, so as to enable the location sensor to maintain high-precision output.

In this embodiment, the control module determines whether quality of location information output by the satellite navigation apparatus at a current location satisfies a preset condition, and controls, if the quality does not satisfy the preset condition, the moving module to actuate the automatic mower to change a moving manner, to enable quality of location information output by the satellite navigation apparatus at a location after the movement to satisfy the preset condition. Specifically, in this embodiment, the automatic mower includes a storage unit, electrically connected to the control module and the satellite navigation apparatus. The storage unit may be a storage unit integrated in a navigation module, or a storage unit integrated in a control circuit of the automatic mower. A location at which quality of location information output by the satellite navigation apparatus satisfies the preset condition is referred to as an expected location, and the storage unit stores information of the expected location. Controlling, by the control module, the moving module to actuate the automatic mower to change a moving manner includes controlling the moving module to actuate the automatic mower to move toward the expected location. That is, during a moving process of the automatic mower, the satellite navigation apparatus or the control module evaluates quality of location information output by the satellite navigation apparatus at a location by which the automatic mower moves and passes, and records a location at which quality of location information output by the satellite navigation apparatus satisfies a preset condition, and the location is usually a location at which the mobile station can receive a good satellite signal or base station signal. When the automatic mower enters a shaded area, because the automatic mower cannot perform precise navigation for a long time in the shaded area, the automatic mower needs to return to an area where a satellite navigation signal is good and use the satellite navigation signal to correct the output of the location sensor, so as to enable the automatic mower to maintain high-precision navigation, thereby avoiding a security problem that the automatic mower leaves the working area because of low-precision navigation, a problem that the working efficiency of the automatic mower is reduced, and the like.

In this embodiment, the control module determines distances between several expected locations stored in the storage unit and the current location of the self-moving device, chooses one of the several expected locations according to the distances between the expected locations and the current location of the self-moving device, and controls the moving module to actuate the self-moving device to move toward the chosen expected location. Specifically, in this embodiment, the control module controls the moving module to actuate the automatic mower to move toward an expected location closest to the current location of the automatic mower. In another embodiment, a range of distance between the expected location and the current location of the automatic mower may alternatively be set to control the automatic mower to move toward an expected location within the range of distance. Controlling the automatic mower to move toward a closest expected location or an expected location within a preset range of distance can improve working efficiency of the automatic mower and reduce consumption of energy.

In this embodiment, the location at which the quality of the location information output by the satellite navigation apparatus does not satisfy the preset condition before the self-moving device changes the moving manner is referred to as an original location, and the storage unit stores information of the original location. After the self-moving device moves to the expected location, the control module controls the moving module to actuate the self-moving device to return to the original location. After the automatic mower moves to the expected location, quality of location information output by the satellite navigation apparatus is improved, the automatic mower re-obtains high-precision location information, and the output of the location sensor is also corrected. Therefore, when the automatic mower returns to the original location, high-precision navigation can be maintained, so that the automatic mower can complete mowing work in a shaded area, thereby resolving a problem that the automatic mower cannot complete mowing in the shaded area. It could be understood that when the automatic mower moves toward the original location, the automatic mower does not need to return to a specific point before the moving manner is changed, and instead, may only move toward the direction to return to an area where mowing is not completed.

In this embodiment, the control module controls the moving module to actuate the automatic mower to move along a preset path. The preset path may be a parallel reciprocating path, a spiral path, or the like. When the control module determines that the location information output by the satellite navigation apparatus does not satisfy the preset condition, a moving manner of the automatic mower is changed. Specifically, refer to FIG. 3 for the moving manner of the automatic mower. In this embodiment, before the control module controls the moving module to actuate the automatic mower to change a moving manner, the control module controls the moving module to actuate the automatic mower to move along parallel straight lines. After the control module determines that the quality of the location information output by the satellite navigation apparatus does not satisfy the preset condition, the control module controls the moving module to actuate the automatic mower to continue to move along the parallel straight lines for a preset time or by a preset distance. Within the preset time or preset distance, an error of output of the inertial navigation sensor is small, and the automatic mower can maintain relatively high-precision navigation. After the automatic mower moves for the preset time or by the preset distance, the control module controls the moving module to actuate the automatic mower to move toward a first expected location. The first expected location is an expected location closest to the current location of the automatic mower in the expected locations recorded by the storage unit. After the automatic mower moves to the first expected location, a satellite navigation signal of the automatic mower is good. The satellite navigation signal is used to correct the error of the output of the inertial navigation sensor, to recover high precision of the output of the inertial navigation sensor. The automatic mower returns to the original location again, and continues to move along a preset parallel straight-line path, that is, continues to execute lawn mowing work in the shaded area. During a moving process of the automatic mower, if the quality of the location information output by the satellite navigation apparatus still does not satisfy the preset condition, after moving for the preset time or by the preset distance, the automatic mower changes a moving manner again. The foregoing steps are repeated until the automatic mower leaves the shaded area.

In this embodiment, when the automatic mower moves to an area where a satellite navigation signal is poor, a moving manner is changed to enable the automatic mower to still maintain high-precision navigation and complete mowing in the area where the satellite navigation signal is poor, so that the automatic mower can efficiently complete mowing of the entire working area.

In this embodiment, the quality of the location information output by the satellite navigation apparatus needs to satisfy a preset condition, which, as stated above, may be determined according to the quantity of satellites from which the satellite navigation apparatus can receive a signal, or a positioning status indication, or a precision factor, or a combination of various factors. For example, the preset condition may be that the quantity of satellites from which the satellite navigation apparatus receives a signal is greater than or equal to 4.

Figure 3:
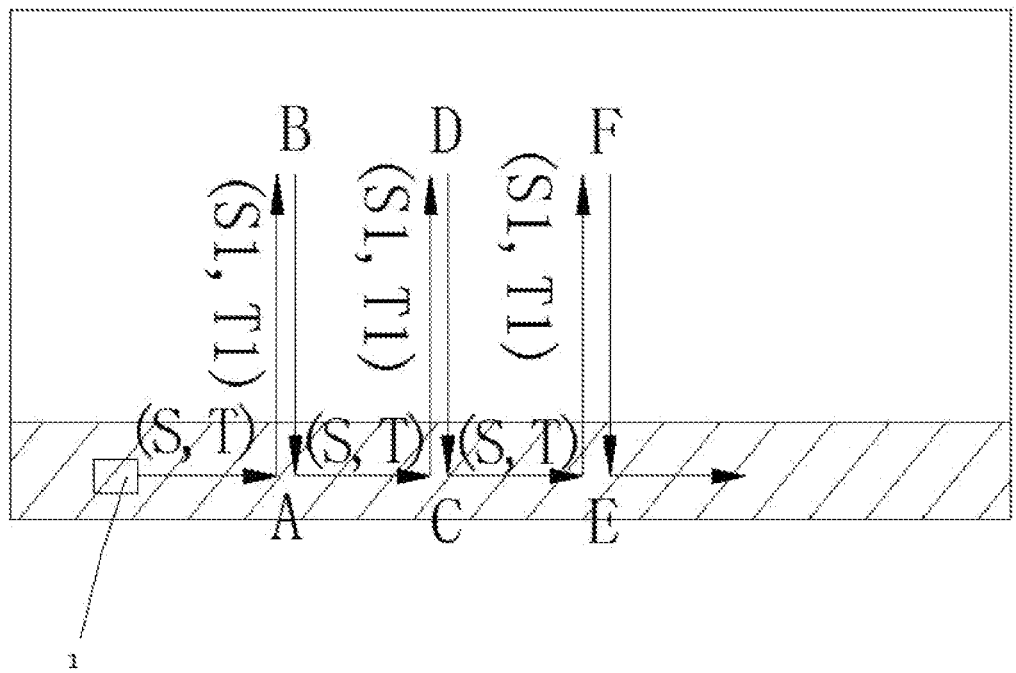
FIG. 3 is a schematic diagram of a moving manner of an automatic mower according to an embodiment of the present invention.

It could be understood that FIG. 3 is merely a schematic diagram of a moving manner of an automatic mower according to this embodiment. A specific path on which the automatic mower changes a moving manner may be flexibly chosen. After the automatic mower moves toward the expected location, the automatic mower alternatively does not need to return to the original location immediately, and instead, after completing mowing of the entire or partial working area, returns to a shaded area that has not been mowed. After the automatic mower travels to the expected location, the automatic mower can continue to move along the uncovered preset path or re-plan the path.

Figure 4:
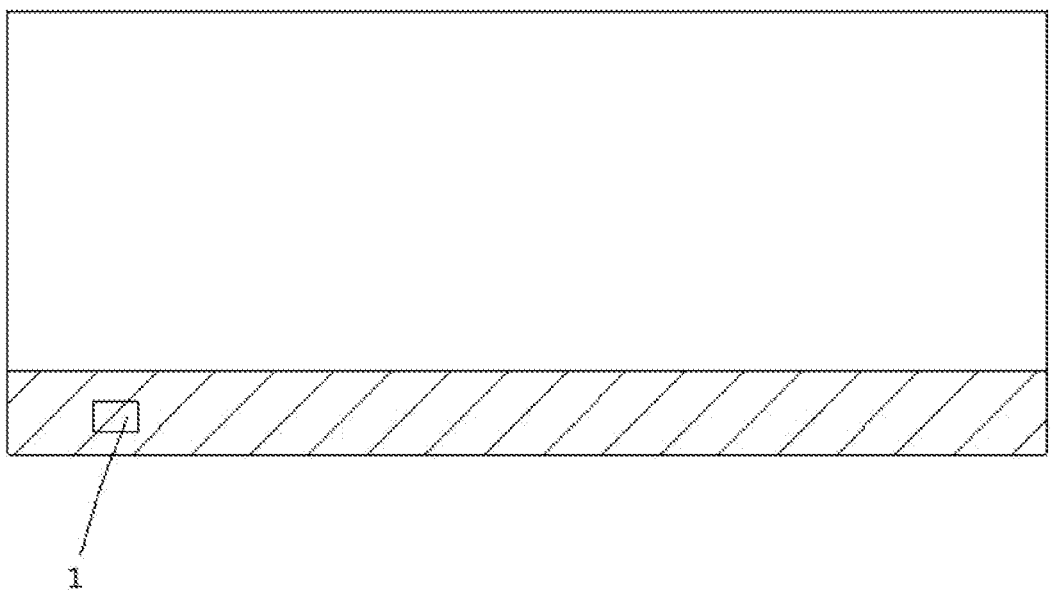
FIG. 4 is a schematic diagram of a working scenario of an automatic mower according to another embodiment of the present invention.

In another embodiment of the present invention, as shown in FIG. 4, when the automatic mower 1 travels alongside an obstacle such as a fence/a tree/flowers (a dotted-line part in FIG. 1 is a shadow formed by the obstacle such as the fence/tree/flowers), because of blocking, a GPS signal is relatively poor, and in this case, if GPS navigation continues to be used, the navigation is basically "blind navigation" and would cause a relatively large error. If the automatic mower is instructed to stop working and execute the lawn mowing task again after the GPS signal is stronger, efficiency is obviously reduced. In this case, the automatic mower may alternatively use an inertial navigation system carried thereon to perform navigation. However, it could be learned from a working principle of the inertial navigation system (a working principle of inertial navigation is based on Newton's laws of mechanics, and is measuring acceleration of a carrier in an inertial reference system, performing integration on time by using the acceleration, and converting the acceleration into a navigation coordinate system, so as to obtain information, such as a velocity, a yaw angle, and a location, in the navigation coordinate system) that the inertial navigation system is a calculation navigation manner, where as time extends, its precision is certainly reduced, and this is disadvantageous to long-time working of the automatic mower.

Figure 5:
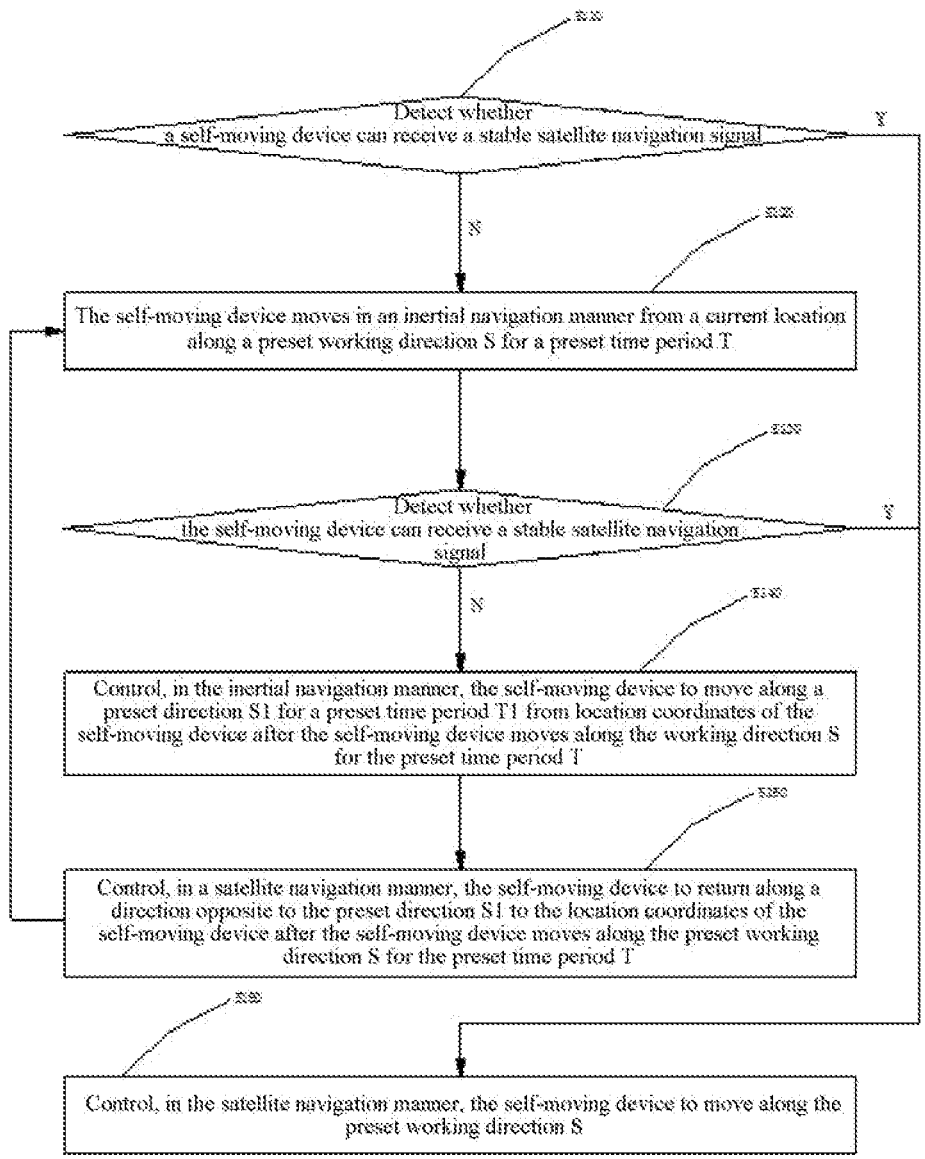
FIG. 5 is a flowchart of a method for navigating an automatic mower according to another embodiment of the present invention.

Therefore, as shown in FIG. 5, a method for navigating a self-moving device of an embodiment includes steps S110 to S160.

Step S110: Detect whether a self-moving device can receive a stable satellite navigation signal, and if the self-moving device can receive a stable satellite navigation signal, proceed to step S160.

Step S120: If the self-moving device cannot receive a stable satellite navigation signal, the self-moving device moves in an inertial navigation manner from a current location along a preset working direction S for a preset time period T, and records corresponding location coordinates of the self-moving device after the movement.

Step S130: Detect whether the self-moving device can receive a stable satellite navigation signal, and if the self-moving device can receive a stable satellite navigation signal, proceed to step S160.

Step S140: If the self-moving device cannot receive a stable satellite navigation signal, the self-moving device moves in the inertial navigation manner along a preset direction S1 for a preset time period T1 from the location coordinates of the moving device after the moving device moves along the working direction S for the preset time period T, where after moving along the preset direction S1 for the preset time period T1, the self-moving device can receive a stable satellite navigation signal.

Step S150: Control, in a satellite navigation manner, the self-moving device to return along a direction opposite to the preset direction S1 to the location coordinates of the self-moving device after the self-moving device moves along the preset working direction S for the preset time period T, where postures of the self-moving device before and after the movement are the same, and proceed to step S120.

Step S160: The self-moving device controls, in the satellite navigation manner, the self-moving device to move along the preset working direction S until the self-moving device completes a working task.

In the foregoing method for navigating a self-moving device, when a satellite navigation signal cannot be received, a manner of alternating inertial navigation and satellite navigation may be adopted to ensure correctness of a path during working of the self-moving device, thereby improving navigation precision and reducing a navigation error.

When the self-moving device adopts the inertial navigation manner, if the time period T during which the self-moving device moves along the preset working direction S is excessively long, a path error of the self-moving device is relatively large. Therefore, the time period T should be limited within a specific range. When the time period T1 during which the self-moving device moves along the preset direction S1 is excessively long, because the preset direction S1 is not a working direction and is merely used for correcting a path error, the time period T1 should also be limited within a specific range, so as to correct a navigation error as much as possible while reducing energy consumption of the self-moving device as much as possible. When the self-moving device moves along S and S1, a sum of moving times T and T1 corresponding thereto should be less than a time during which the self-moving device can maintain high-precision positioning of inertial navigation, so as to sufficiently ensure accuracy of movement of the self-moving device along S and S1 by using the inertial navigation.

When the self-moving device moves along the preset direction S1, it should be ensured that the self-moving device can receive a stable satellite navigation signal within a shortest time. Therefore, an angle between the preset direction S1 and the working direction S includes, but is not limited to, a 90-degree angle, so as to shorten, as much as possible, a time within which the self-moving device can receive a satellite navigation signal while moving along the preset direction S1. Moreover, correspondingly, the time period T1 may be preset to the shortest time to improve working efficiency of the self-moving device.

When the self-moving device moves along the preset direction S1, the self-moving device is located in different areas, and cases in which the self-moving device can receive a satellite signal are different in the different areas. Therefore, when the self-moving device moves long the direction S1 in the different areas, times within which the self-moving device can receive a stable satellite navigation signal are different, that is, the time period T1 for which the self-moving device moves along the direction S1 may differ in different areas and may be, for example, 5 seconds, 6 seconds, or 10 seconds. However, the time period T1 should be the shortest time within which the self-moving device can receive a satellite navigation signal while moving along the preset direction S1.

The self-moving device may be different types of devices, and in particular, an automatic mower. A schematic diagram of that the automatic mower works according to the foregoing navigation method is shown in FIG. 3. When an automatic mower R cannot receive a satellite navigation signal, the automatic mower R moves, in an inertial navigation manner, along a working direction S for a time period T to a point A, if the automatic mower R cannot receive a satellite navigation signal at the point A, the automatic mower R moves along a preset direction S1 for a time period T1 to a point B (where the automatic mower can receive a stable satellite navigation signal at the point B), and the automatic mower returns from the point B to the point A. Subsequently, the automatic mower moves from the point A along the working direction S for the time period T to a point C, if the automatic mower cannot receive a satellite navigation signal at the point C, the automatic mower moves long the preset direction S1 for the time period T1 to a point D (where the automatic mower can receive a stable satellite navigation signal at the point D), and the automatic mower returns from the point D to the point C. Afterward, the automatic mower moves from the point C along the working direction S for the time period T to a point E, if the automatic mower cannot receive a satellite navigation signal at the point E, the automatic mower moves long the preset direction S1 for the time period T1 to a point F (where the automatic mower can receive a stable satellite navigation signal at the point F), and automatic mower returns from the point F to the point E. The foregoing process is repeated until the automatic mower can receive a stable satellite navigation signal to move in a satellite navigation manner until the working task is completed.

This embodiment further provides a self-moving device performing navigation by using the foregoing navigation method, and the self-moving device includes a satellite navigation module and an inertial navigation module and further includes:

a detection module, configured to detect whether the satellite navigation module can receive a stable satellite navigation signal;

a first control module, configured to use, when the detection module detects that the satellite navigation module can receive a stable satellite navigation signal, the satellite navigation module to control the self-moving device to move along a preset working direction S or use, when the detection module detects that the satellite navigation module cannot receive a stable satellite navigation signal, the inertial navigation module to control the self-moving device to move from a current location along a preset working direction S for a preset time period T, and record corresponding location coordinates of the self-moving device after the movement;

a second control module, configured to use, when the detection module detects that the satellite navigation module can receive a stable satellite navigation signal, the satellite navigation module to control the self-moving device to move along the preset working direction S or use, when the detection module detects that the satellite navigation module cannot receive a stable satellite navigation signal, the inertial navigation module to control the self-moving device to move along a preset direction S1 for a preset time period T1, where after moving along the preset direction S1 for the preset time period T1, the self-moving device can receive a stable satellite navigation signal;

a third control module, configured to use the satellite navigation module to control the self-moving device to return along a direction opposite to the preset direction S1 to location coordinates of the self-moving device after the self-moving device moves along the preset working direction S for the preset time period T; and a main control module, configured to control the detection module, the first control module, the second control module, and the third control module to work.

In the foregoing method for navigating a self-moving device, when a satellite navigation signal cannot be received, a manner of alternating inertial navigation and satellite navigation may be adopted to ensure correctness of a path during working of the self-moving device, thereby improving navigation precision and reducing a navigation error.

When the self-moving device adopts the inertial navigation manner, if the time period T during which the self-moving device moves along the preset working direction S is excessively long, a path error of the self-moving device is relatively large. Therefore, the time period T should be limited within a specific range. When the time period T1 during which the self-moving device moves along the preset direction S1 is excessively long, because the preset direction S1 is not a working direction and is merely used for correcting a path error, the time period T1 should also be limited within a specific range, so as to correct a navigation error as much as possible while reducing energy consumption of the self-moving device as much as possible. Therefore, a sum of the preset time periods T and T1 is less than a time during which the self-moving device can maintain high-precision positioning of inertial navigation.

When the self-moving device moves along the preset direction S1, it should be ensured that the self-moving device can receive a stable satellite navigation signal within a shortest time. Therefore, an angle between the preset direction S1 and the working direction S includes, but is not limited to, a 90-degree angle, so as to shorten, as much as possible, a time within which the self-moving device can receive a satellite navigation signal while moving along the preset direction S1. Moreover, correspondingly, the time period T1 may be preset to the shortest time to improve working efficiency of the self-moving device.

The first control module includes:

a first navigation unit, configured to use the satellite navigation module to control the self-moving device to move along the preset working direction S;

a second navigation unit, configured to use the inertial navigation module to control the self-moving device to move from the current location along the preset working direction S for the preset time period T; and a recording unit, configured to record corresponding location coordinates of the self-moving device after the movement and a posture of the self-moving device.

The second control module includes:

a first control unit, configured to use the satellite navigation module to control the self-moving device to move along the preset working direction S; and a second control unit, configured to use the inertial navigation module to control the self-moving device to move along the preset direction S1 for the preset time period T1.

Figure 6:
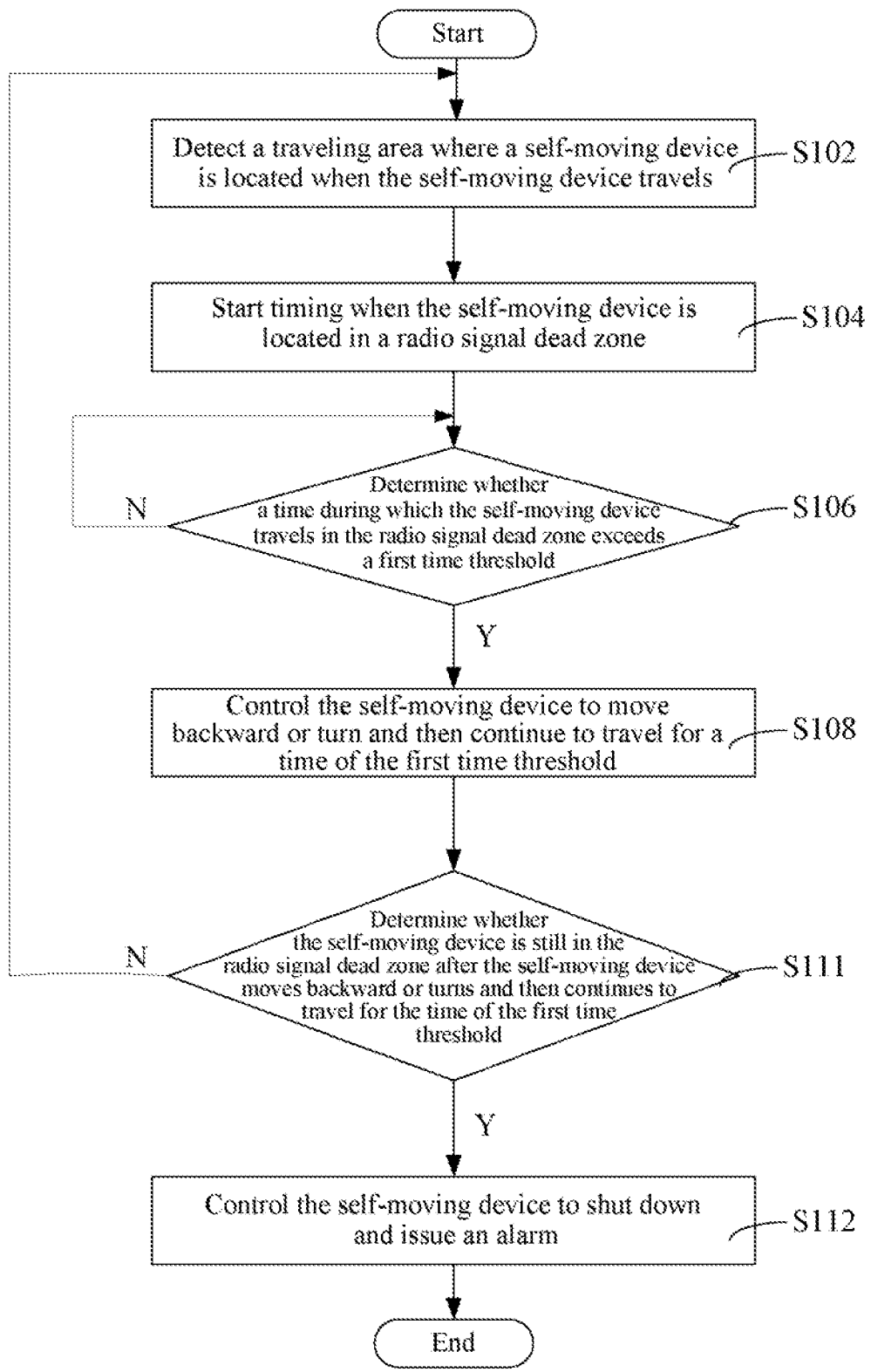
FIG. 6 is a flowchart of a method for controlling traveling of an automatic mower according to another embodiment of the present invention.

In another embodiment of the present invention, referring to FIG. 6, FIG. 6 is a flowchart of a method for controlling traveling of a self-moving device. In this embodiment, a traveling area of the self-moving device includes a radio signal dead zone and a radio signal coverage area. The method includes:

S102: Detect a traveling area where a self-moving device is located when the self-moving device travels.

Because precision of DGPS positioning of a mobile station is improved by means of communication with a base station, that is, the mobile station needs to receive a pseudo range correction (PRC) value sent by the base station in real time, but in actual applications, because of existence of blocking of obstacles such as a house, in communication between the base station and the mobile station, a dead zone or an area where a signal is relatively poor may appear, precise positioning of the mobile station is affected. Therefore, in this embodiment, a traveling area where the self-moving device is located is determined first, and if the self-moving device is located in a radio signal dead zone, a corresponding control policy is used to ensure that the self-moving device would not enter a dangerous area, so as to prevent damage to the self-moving device.

S104: Start timing when the self-moving device is located in a radio signal dead zone.

In this embodiment, the self-moving device is controlled to continue to travel. Usually, the self-moving device may be controlled to continue to travel according to a pre-planned path, or traveling of the self-moving device may be controlled according to a specific control policy.

S106: Determine whether a time during which the self-moving device travels in the radio signal dead zone exceeds a first time threshold.

In this embodiment, when the self-moving device enters a radio signal dead zone, the self-moving device is usually controlled to continue traveling according to a pre-planned path. If the self-moving device travels out of the radio signal dead zone within a first time threshold, that is, when the self-moving device travels to a radio signal coverage area, the self-moving device continues traveling according to the pre-planned path. If the self-moving device is still in the radio signal dead zone within the first time threshold, and if the self-moving device continues traveling according to the pre-planned path, the self-moving device may travel to a dangerous area. Therefore, traveling of the self-moving device needs to be controlled. Refer to the following for details. In addition, the first time threshold may be preset according to the width and the length of the radio signal dead zone, and may be, for example, 5 seconds, 10 seconds, 15 seconds, 18 seconds, or 20 seconds. However, usually, the first time threshold is less than or equal to 10 seconds.

S108: When the time during which the self-moving device travels in the radio signal dead zone exceeds the first time threshold, control the self-moving device to move backward or turn and then continue to travel for a time of the first time threshold; otherwise, go back to step S106 to determine whether the time during which the self-moving device travels in the radio signal dead zone exceeds the first time threshold.

In this embodiment, because the time during which the self-moving device resides in the radio signal dead zone exceeds the first time threshold, to prevent the self-moving device from traveling into a dangerous area, a safest approach is enabling the self-moving device to return according to an original path, that is, to move backward and continue to travel for the time of the first time threshold. Alternatively, in another embodiment, the self-moving device may be controlled to turn, where, for example, a traveling direction of the self-moving device is controlled to rotate by an angle, and then the self-moving device continues to travel for the time of the first time threshold, where the angle ranges from 0 degrees to 180 degrees.

S111: Determine whether the self-moving device is still in the radio signal dead zone after the self-moving device moves backward or turns and then continues to travel for the time of the first time threshold.

S112: Control the self-moving device to shut down and issue an alarm when the self-moving device is still in the radio signal dead zone after the self-moving device moves backward or turns and then continues to travel for the time of the first time threshold; otherwise; otherwise, go back to step S102 to determine whether the self-moving device is located in the radio signal dead zone.

In this embodiment, the self-moving device may be controlled, by using devices such as a buzzer, to shut down and issue an alarm. Alternatively, information about that the self-moving device is located in the radio signal dead zone may be sent to a background.

In the foregoing method for controlling traveling of the self-moving device, operation of the self-moving device is controlled by determining whether the self-moving device is located in the radio signal dead zone, so that when the self-moving device is in an area where positioning precision is poor such as a radio signal dead zone, the self-moving device can be prevented from traveling into a dangerous area, so as to prevent the self-moving device from being damaged.

Figure 7:
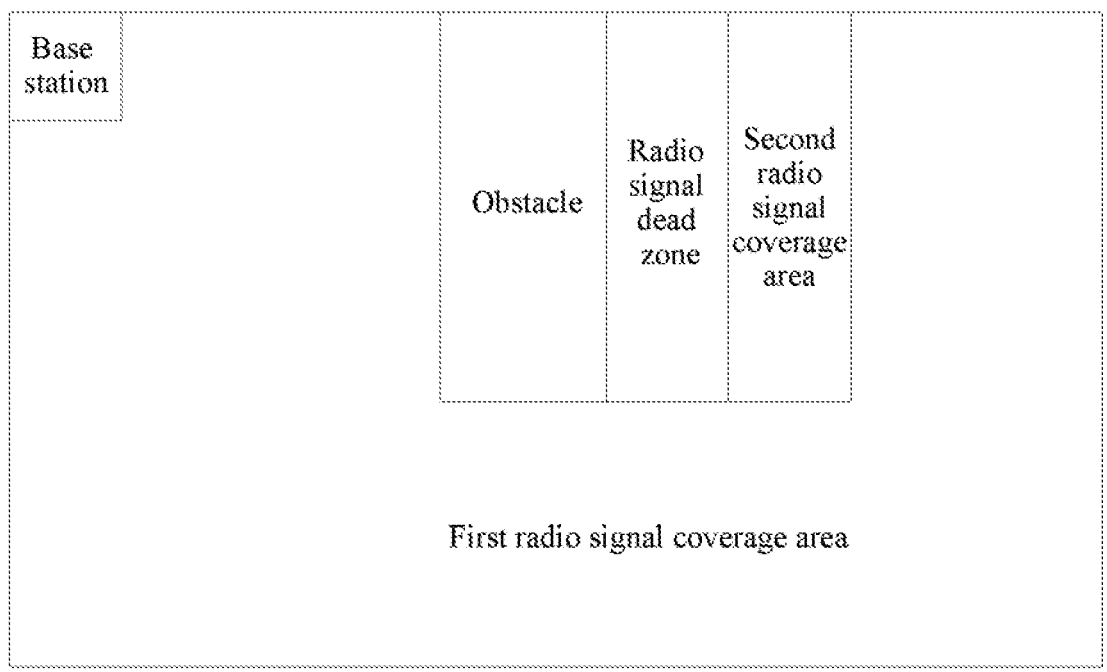
FIG. 7 is a schematic diagram of a traveling area of an automatic mower according to another embodiment of the present invention.
Figure 8:
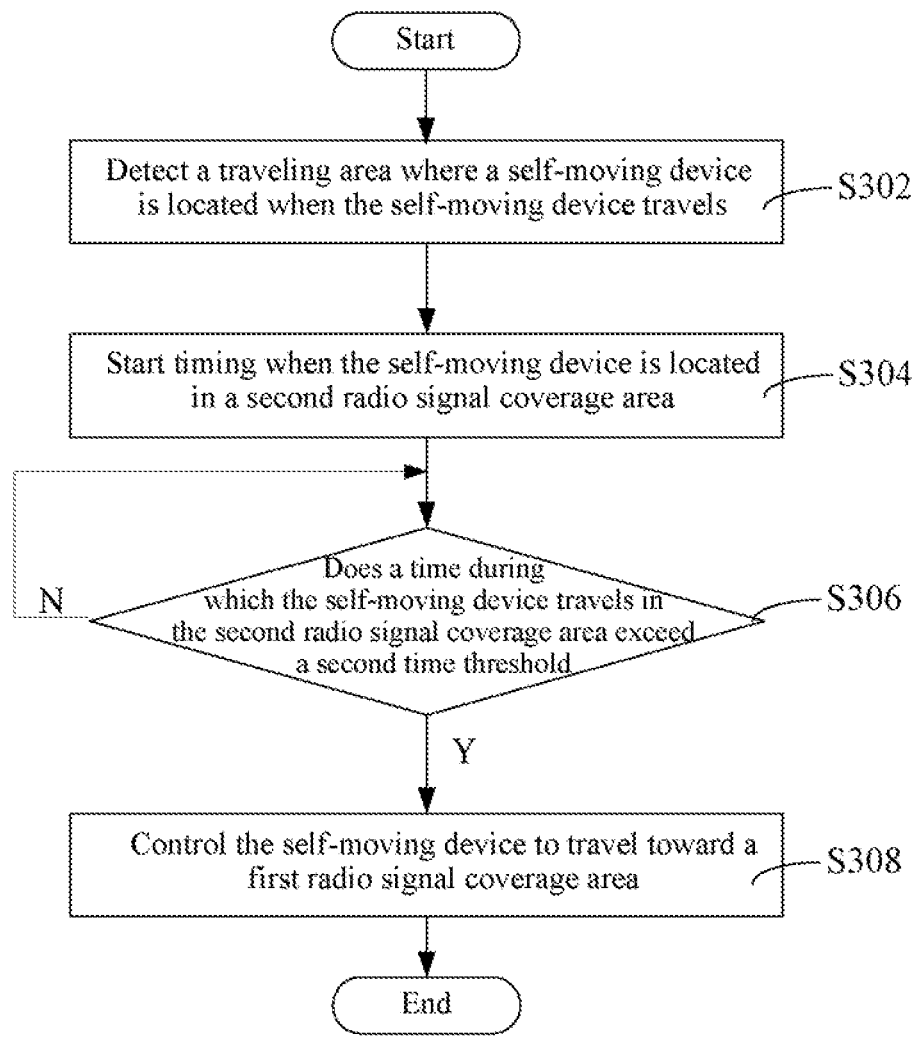
FIG. 8 is a flowchart of a method for controlling traveling of an automatic mower located in a second radio signal coverage area according to another embodiment of the present invention.

In one of the embodiments, referring to FIG. 7, FIG. 7 is a schematic diagram of a traveling area of a self-moving device in an embodiment. In one of the embodiments, the radio signal coverage area includes a first radio signal coverage area and a second radio signal coverage area, where the strength of a radio signal of the first radio signal coverage area is higher than the strength of a radio signal of the second radio signal coverage area. Usually, the first radio signal coverage area is an area where a radio signal is good, and the second radio signal coverage area is an area where a radio signal is relatively poor. In the second radio signal coverage area, the self-moving device may obtain a PRC signal sent by a base station, but the signal strength of the PRC signal is relatively poor, and there is much interference. Referring to FIG. 8, FIG. 8 is a flowchart of a method for controlling traveling of a self-moving device located in a second radio signal coverage area in an embodiment. In this embodiment, the method includes:

S302: Detect a traveling area where a self-moving device is located when the self-moving device travels.

In this embodiment, a radio signal coverage area is divided into a first radio signal coverage area and a second radio signal coverage area. In the first radio signal coverage area, precise positioning of the self-moving device can be implemented, and the self-moving device only needs to continue traveling according to a pre-planned path. However, if the self-moving device is located in the second radio signal coverage area, because a signal of a base station received by a mobile station on the self-moving device has much interference, positioning of the self-moving device is no longer precise. Consequently. if the self-moving device continues traveling, the self-moving device is likely to enter a dangerous area, and therefore, traveling of the self-moving device needs to be controlled. Refer to the following for details.

S304: Start timing when the self-moving device is located in a second radio signal coverage area.

In this embodiment, a second time threshold may be set according to the width and the length of the second radio signal coverage area, and may be, for example, 10 seconds, 15 seconds, 22 seconds, 25 seconds, 28 seconds, 30 seconds, or 35 seconds or the like. However, usually, the second time threshold is less than or equal to 30 seconds, and the second time threshold is usually greater than a first time threshold.

S306: Determine whether a time during which the self-moving device travels in the second radio signal coverage area exceeds a second time threshold.

S308: When the time during which the self-moving device travels in the second radio signal coverage area exceeds the second time threshold, control the self-moving device to travel toward a first radio signal coverage area; otherwise, go back to step S306 to determine whether the time during which the self-moving device travels in the second radio signal coverage area exceeds the second time threshold.

In this embodiment, since the self-moving device is not completely unable receive a signal of a base station, a received signal of a base station is relatively poor, the self-moving device can approximately obtain a relative direction between a current location of the self-moving device and the first radio signal coverage area, so that the self-moving device can travel toward the first radio signal coverage area according to the relative direction. Therefore, the step of controlling the self-moving device to travel toward the first radio signal coverage area may include: obtaining a relative direction between a current location of the self-moving device and the first radio signal coverage area; and controlling, according to the relative direction, the self-moving device to travel toward the first radio signal coverage area.

Figure 9:
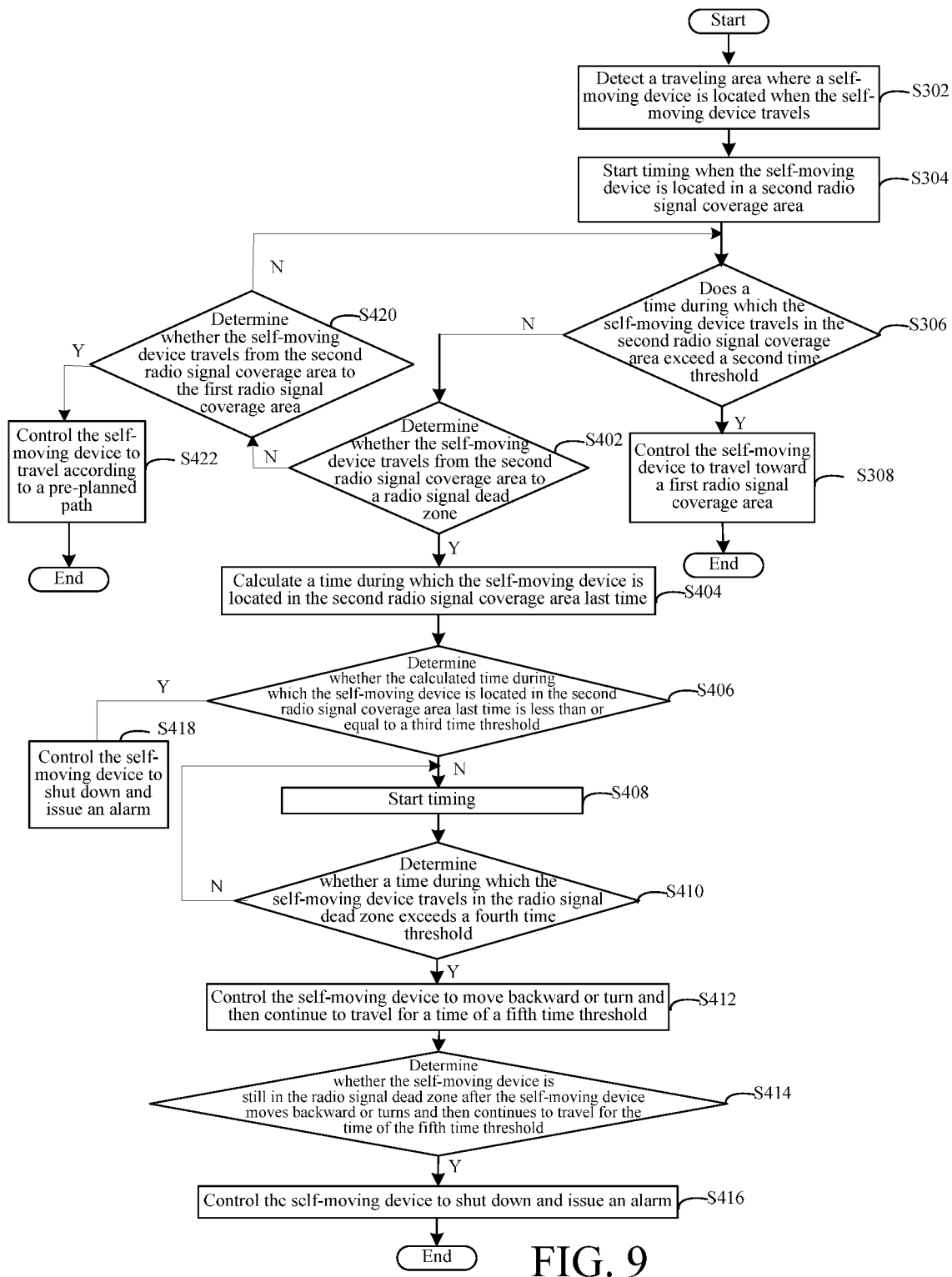
FIG. 9 is a flowchart of a method for controlling traveling of an automatic mower located in a second radio signal coverage area according to still another embodiment of the present invention.

In one of the embodiments, when the self-moving device travels from the second radio signal coverage area to the first radio signal coverage area within the second time threshold time, the self-moving device only needs to continue traveling according to a pre-planned path. However, if the self-moving device travels from the second radio signal coverage area to the radio signal dead zone within the second time threshold time, the self-moving device cannot obtain precise positioning thereof. Therefore, referring to FIG. 9, FIG. 9 is a flowchart of a method for controlling traveling of a self-moving device located in a second radio signal coverage area in still another embodiment. In this embodiment, the method includes:

S402: Determine whether the self-moving device travels from the second radio signal coverage area to a radio signal dead zone.

S404: When the self-moving device travels from the second radio signal coverage area to the radio signal dead zone, calculate a time during which the self-moving device is located in the second radio signal coverage area last time; otherwise, proceed to step S420 to determine whether the self-moving device travels from the second radio signal coverage area to a first radio signal coverage area.

Because the self-moving device travels from the second radio signal coverage area to the radio signal dead zone, and because in the second radio signal coverage area, the self-moving device already cannot perform positioning precisely, and if a time of further traveling to the radio signal dead zone is relatively long, a time during which the self-moving device cannot perform positioning precisely is excessively long, and the self-moving device is very likely to travel to a dangerous area, a time during which the self-moving device travels in the second radio signal coverage area needs to be calculated, and a threshold of a traveling time of the self-moving device in the radio signal dead zone is determined according to the time.

S406: Determine whether the calculated time during which the self-moving device is located in the second radio signal coverage area last time is less than or equal to a third time threshold. In this embodiment, the third time threshold may be 5 seconds, 6 seconds, 8 seconds, 10 seconds, 12 seconds, 15 seconds, 18 seconds, or the like. Usually, the third time threshold is less than or equal to 10 seconds, and the third time threshold is less than the second time threshold.

S408: Start timing when the calculated time during which the self-moving device is located in the second radio signal coverage area last time is less than or equal to the third time threshold; otherwise, proceed to step S418 to control the self-moving device to shut down and issue an alarm.

S410: Determine whether a time during which the self-moving device travels in the radio signal dead zone exceeds a fourth time threshold.

In this embodiment, the fourth time threshold is determined according to the time during which the self-moving device is located in the second radio signal coverage area last time. The fourth time threshold may be 5 seconds, 7 seconds, 9 seconds, 12 seconds, 15 seconds, 18 seconds, or the like. Usually, the fourth time threshold is less than or equal to 10 seconds, and the fourth time threshold is less than the first time threshold.

S412: When the time during which the self-moving device travels in the radio signal dead zone exceeds the fourth time threshold, control the self-moving device to move backward or turn and then continue to travel for a time of a fifth time threshold. In this embodiment, the fifth time threshold may be 5 seconds, 7 seconds, 9 seconds, 12 seconds, 15 seconds, 18 seconds, or the like. Usually, the fifth time threshold is 10 seconds, and the fifth time threshold is equal to or more than the fourth time threshold.

S414: Determine whether the self-moving device is still in the radio signal dead zone after the self-moving device moves backward or turns and then continues to travel for the time of the fifth time threshold.

S416: Control the self-moving device to shut down and issue an alarm when the self-moving device is still in the radio signal dead zone after the self-moving device moves backward or turns and then continues to travel for the time of the fifth time threshold.

S418: Control the self-moving device to shut down and issue an alarm.

S420: Determine whether the self-moving device travels from the second radio signal coverage area to the first radio signal coverage area.

S422: When the self-moving device travels from the second radio signal coverage area to the first radio signal coverage area, control the self-moving device to travel according to a pre-planned path; otherwise, go back to step S306 to continue to determine whether the time during which the self-moving device travels in the second radio signal coverage area exceeds the second time threshold.

In this embodiment, the self-moving device may be controlled, by using devices such as a buzzer, to shut down and issue an alarm. Alternatively, information about that the self-moving device is located in the radio signal dead zone may be sent to a background.

In one of the embodiments, the self-moving device is controlled to shut down and issue an alarm when the calculated time during which the self-moving device is located in the second radio signal coverage area last time exceeds the third time threshold and is less than the second time threshold.

Figure 10:
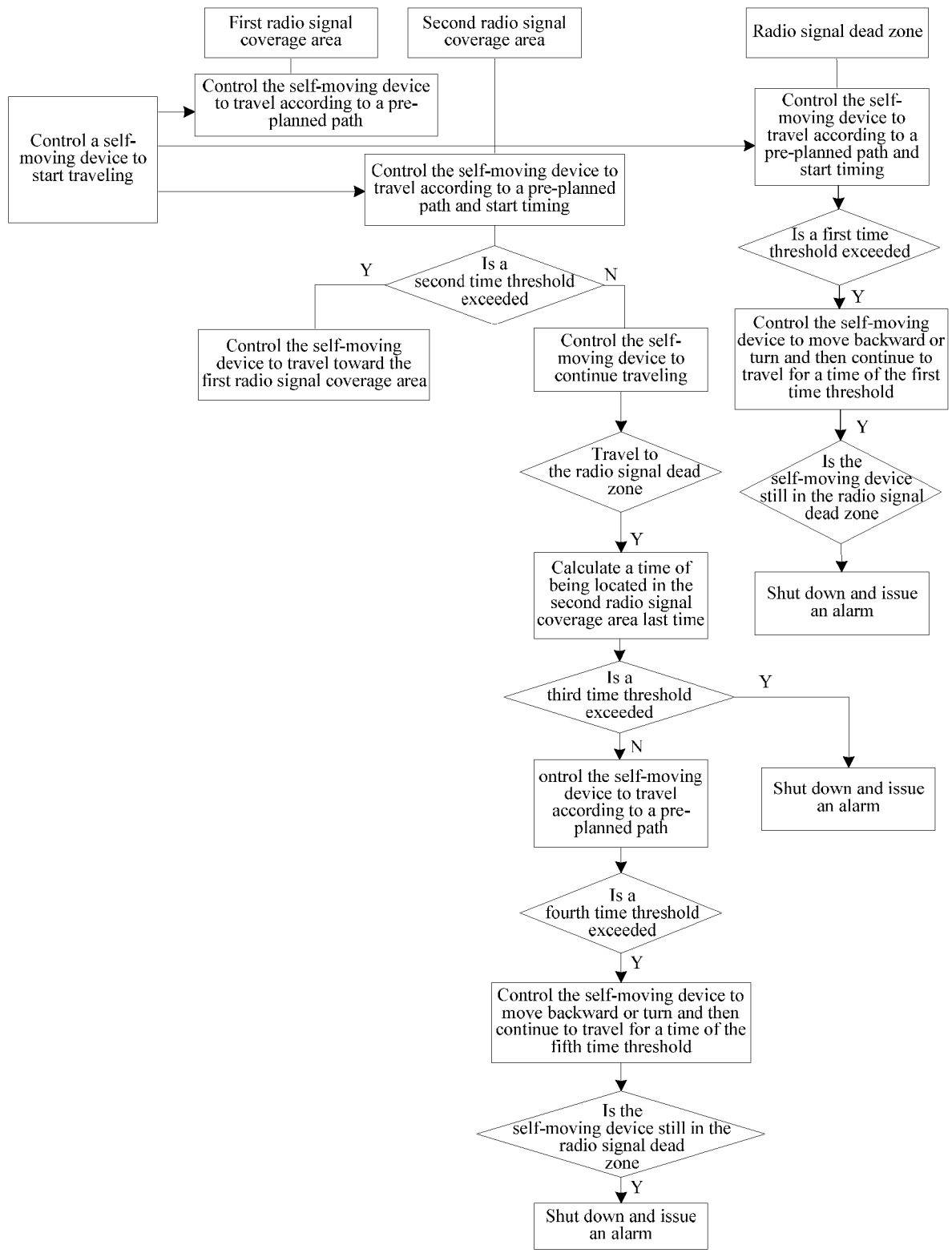
FIG. 10 is a flowchart of a method for controlling traveling of an automatic mower according to another embodiment of the present invention.

To make a person skilled in the art fully understand the method in this embodiment, a method for controlling traveling of a self-moving device in this embodiment is described below with reference to FIG. 10. FIG. 10 is a flowchart of a method for controlling traveling of a self-moving device in another embodiment. In this embodiment, a self-moving device is first controlled to start traveling.

If the self-moving device is located in a first radio signal coverage area, the self-moving device is controlled to travel according to a pre-planned path.

If the self-moving device is located in a radio signal dead zone, the self-moving device is controlled to travel according to a pre-planned path and start timing. If a time of traveling in the radio signal dead zone exceeds a first threshold time, the self-moving device is controlled to move backward or turn and then continue to travel for a time of the first time threshold. If the self-moving device is still in the radio signal dead zone after the self-moving device travels for the time of the first time threshold, the self-moving device shuts down and issues an alarm.

If the self-moving device is located in the second radio signal coverage area, the self-moving device is controlled to travel according to a pre-planned path and start timing. If a time of traveling in the second radio signal coverage area exceeds a second time threshold, the self-moving device is controlled to travel toward the first radio signal coverage area. If the time of traveling in the second radio signal coverage area does not exceed the second time threshold, the self-moving device is controlled to continue to travel, and it is determined whether the self-moving device travels to the radio signal dead zone. If the self-moving device travels to the radio signal dead zone, a time of being located in the second radio signal coverage area last time is calculated, and it is determined whether the time of being located in the second radio signal coverage area last time exceeds a third time threshold. If the third time threshold is not exceeded, the self-moving device is controlled to continue traveling according to the pre-planned path, and it is determined whether a time during which the self-moving device travels in the radio signal dead zone exceeds a fourth time threshold. If the fourth time threshold is exceeded, the self-moving device is controlled to move backward or turn and then continue to travel a time of a fifth time threshold. If the self-moving device is still in the radio signal dead zone after the self-moving device travels for the time of the fifth time threshold, the self-moving device shuts down and issues an alarm.

Figure 11:
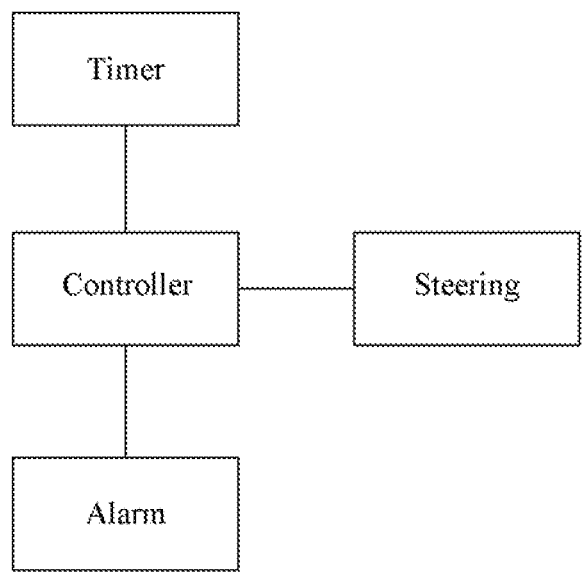
FIG. 11 is a schematic structural diagram of a system for controlling traveling of an automatic mower according to another embodiment of the present invention.

Referring to FIG. 11, FIG. 11 is a schematic structural diagram of a system for controlling traveling of a self-moving device in an embodiment. In this embodiment, a traveling area of the self-moving device includes a radio signal dead zone and a radio signal coverage area. The system may include a controller, a timer, a steering, and an alarm. The timer is connected to the controller, the steering is connected to the controller, and the alarm is connected to the controller. The controller is configured to detect whether the self-moving device is located in the radio signal dead zone when the self-moving device travels; the timer is configured to start timing when the self-moving device is located in the radio signal dead zone; the steering is configured to: when a time during which the self-moving device travels in the radio signal dead zone exceeds a first time threshold, control the self-moving device to move backward or turn, where after the self-moving device moves backward or turns, the controller is further configured to control the self-moving device to continue to travel for a time of the first time threshold; and the alarm is configured to control the self-moving device to shut down and issue an alarm when the self-moving device is still in the radio signal dead zone after the self-moving device moves backward or turns and then continues to travel for the time of the first time threshold.

In one of the embodiments, the steering may include: an angle setting module, configured to set a rotation angle of the self-moving device, where the angle ranges from 0 degrees to 180 degrees; and a steering module, connected to the controller and the angle setting module, and configured to control the self-moving device to move backward or turn by the angle when the time during which the self-moving device travels in the radio signal dead zone exceeds the first time threshold.

In one of the embodiments, the radio signal coverage area includes a first radio signal coverage area and a second radio signal coverage area, where the strength of a radio signal of the first radio signal coverage area is higher than the strength of a radio signal of the second radio signal coverage area; the controller is further configured to detect that the self-moving device is located in the second radio signal coverage area when the self-moving device travels; the timer is further configured to start timing when the self-moving device is located in the second radio signal dead zone; and the steering is further configured to control the self-moving device to travel toward the first radio signal coverage area when a time during which the self-moving device travels in the second radio signal coverage area exceeds a second time threshold.

In one of the embodiments, refer to the descriptions above for values of the first time threshold and the second time threshold. Usually, the first time threshold is less than or equal to 10 seconds, and the second time threshold is less than or equal to 30 seconds.

In one of the embodiments, the controller is further configured to: when the self-moving device travels from the second radio signal coverage area to the radio signal dead zone, calculate a time during which the self-moving device is located in the second radio signal coverage area; the timer is further configured to start timing when the calculated time during which the self-moving device is located in the second radio signal coverage area does not exceed a third time threshold; the steering is further configured to: when a time during which the self-moving device travels in the radio signal dead zone exceeds a fourth time threshold, control the self-moving device to move backward or turn, where the fourth time threshold is less than the first time threshold; and after the self-moving device moves backward or turns, the controller is further configured to control the self-moving device to continue to travel for a time of a fifth time threshold; and the alarm is further configured to control the self-moving device to shut down and issue an alarm when the self-moving device is still in the radio signal dead zone after the self-moving device moves backward or turns and then continues to travel for the time of the fifth time threshold.

In one of the embodiments, the alarm is further configured to control the self-moving device to shut down and issue an alarm when the calculated time during which the self-moving device is located in the second radio signal coverage area last time exceeds the third time threshold and is less than the second time threshold.

In one of the embodiments, refer to the descriptions above for ranges of the third time threshold, the fourth time threshold, and the fifth time threshold. Usually, the third time threshold is less than or equal to 10 seconds, the fourth time threshold is less than 10 seconds, and the fifth time threshold is equal to 10 seconds.

The present invention is not limited to the specific embodiments described, and structures and methods based on the idea of the present invention all fall within the protection scope of the present invention.

What is claimed is:

1. A self-moving device, comprising:
a moving module, a task execution module, and a control module, wherein the control module is electrically connected to the moving module and the task execution module, and is configured to control the moving module to actuate the self-moving device to move, and to control the task execution module to execute a working task;
the self-moving device further comprises a satellite navigation apparatus, electrically connected to the control module and configured to receive a satellite signal and output current location information of the self-moving device, wherein the self-moving device comprises a storage unit, electrically connected to the control module and the satellite navigation apparatus; a location at which quality of location information output by the satellite navigation apparatus satisfies a preset condition is referred to as an expected location; the storage unit stores information of the expected location;
wherein the control module is further configured to:
control the moving module to actuate the self-moving device to move along a preset path;
determine whether quality of location information output by the satellite navigation apparatus at a current location satisfies the preset condition, and if the quality does not satisfy the preset condition, control the moving module to actuate the self-moving device to continue to move along the preset path; if the quality still does not satisfy the preset condition after the self-moving device moves along the preset path for a preset time or by a preset distance, control the moving module to actuate the self-moving device to move toward the expected location, to enable quality of location information output by the satellite navigation apparatus at a location after the movement to satisfy the preset condition.

2. The self-moving device according to claim 1, wherein the control module determines distances between several expected locations stored in the storage unit and the current location of the self-moving device, chooses one of the several expected locations according to the distances between the expected locations and the current location of the self-moving device, and controls the moving module to actuate the self-moving device to move toward the chosen expected location.

3. The self-moving device according to claim 2, wherein the control module controls the moving module to actuate the self-moving device to move toward an expected location closest to the current location of the self-moving device.

4. The self-moving device according to claim 1, wherein a location at which the quality of the location information output by the satellite navigation apparatus does not satisfy the preset condition before the self-moving device changes the moving manner is referred to as an original location, and the storage unit stores information of the original location; and
after the self-moving device moves to the expected location, the control module controls the moving module to actuate the self-moving device to return to the original location.

5. The self-moving device according to claim 4, wherein after controlling the moving module to actuate the self-moving device return to the original location, the control module controls the moving module to actuate the self-moving device to continue to move along the preset path.

6. The self-moving device according to claim 1, wherein the self-moving device further comprises at least one location sensor, electrically connected to the control module, and configured to detect features related to the location of the self-moving device; and
when the quality of the location information output by the satellite navigation apparatus does not satisfy the preset condition, the control module determines the current location of the self-moving device at least partially based on output of the location sensor.

7. The self-moving device according to claim 6, wherein the location sensor comprises at least one of a camera, radar, a capacitive sensor, and an inertial navigation sensor.

8. The self-moving device according to claim 6, wherein when the quality of the location information output by the satellite navigation apparatus satisfies the preset condition, the self-moving device corrects the output of the location sensor by using output of the satellite navigation apparatus.

9. The self-moving device according to claim 1, wherein the preset condition comprises that a quantity of satellites from which the satellite navigation apparatus receives a signal is greater than or equal to a preset value.

10. The self-moving device according to claim 1, wherein if the quality does satisfy the preset condition while the self-moving device moves along the preset path within the preset distance or the preset time, the self-moving device is controlled to continue to move along the preset path.

11. A method for controlling a self-moving device, wherein the self-moving device comprises a satellite navigation apparatus, configured to receive a satellite signal and output current location information of the self-moving device, and the method for controlling a self-moving device comprises steps of:
controlling a moving module to actuate the self-moving device to move along a preset path;
determining a location at which quality of location information output by the satellite navigation apparatus satisfies a preset condition is referred to as an expected location; storing the expected location;
determining whether quality of location information output by the satellite navigation apparatus at a current location satisfies the preset condition, and if the quality does not satisfy the preset condition, control the moving module to actuate the self-moving device to continue to move along the preset path; and
controlling the moving module to actuate the self-moving device to move toward the expected location, if the quality still does not satisfy the preset condition after the self-moving device moves along the preset path for a preset time or by a preset distance, to enable quality of location information output by the satellite navigation apparatus at a location after the movement to satisfy the preset condition.

12. The method for controlling a self-moving device according to claim 11, wherein distances between several stored expected locations and the current location of the self-moving device are determined, one of the several expected locations is chosen according to the distances between the expected locations and the current location of the self-moving device, and the self-moving device is controlled to move toward the chosen expected location.

13. The method for controlling a self-moving device according to claim 12, wherein the self-moving device is controlled to move toward an expected location closest to the current location of the self-moving device.

14. The method for controlling a self-moving device according to claim 11, wherein a location at which the quality of the location information output by the satellite navigation apparatus does not satisfy the preset condition before the self-moving device changes the moving manner is referred to as an original location, and information of the original location is stored; and after the self-moving device is controlled to move to the expected location, the self-moving device is further controlled to return to the original location.

15. The method for controlling a self-moving device according to claim 14, wherein after the self-moving device returns to the original location, the self-moving device is controlled to continue to move along the preset path.

16. The method for controlling a self-moving device according to claim 11, wherein the self-moving device further comprises at least one location sensor, configured to detect features related to the location of the self-moving device; and when the quality of the location information output by the satellite navigation apparatus does not satisfy the preset condition, the current location of the self-moving device is determined at least partially based on output of the location sensor.

17. The method for controlling a self-moving device according to claim 12, controlling the moving module to actuate the self-moving device to continue to move along the preset path, if the quality satisfies the preset condition while the self-moving device moves along the preset path for the preset time or by the preset distance.

18. A self-moving device, comprising:
a moving module, a task execution module, and a control module, wherein the control module is electrically connected to the moving module and the task execution module, and is configured to control the moving module to actuate the self-moving device to move, and to control the task execution module to execute a working task;
the self-moving device further comprises a satellite navigation apparatus, electrically connected to the control module and configured to receive a satellite signal and output current location information of the self-moving device, wherein the self-moving device comprises a storage unit, electrically connected to the control module and the satellite navigation apparatus; a location at which quality of location information output by the satellite navigation apparatus satisfies a preset condition is referred to as an expected location; the storage unit stores information of the expected location; wherein the control module is further configured to:
determine whether quality of location information output by the satellite navigation apparatus at a current location satisfies the preset condition, and if the quality does not satisfy the preset condition while the self-moving device moves along a preset path for a preset time or by a preset distance, control the moving module to actuate the self-moving device to move toward the expected location, to enable quality of location information output by the satellite navigation apparatus at a location after the movement to satisfy the preset condition, and if the quality does satisfy the preset condition while the self-moving device moves along the present path within the preset distance or the preset time, the self-moving device is controlled to continue to move along the preset path.

19. The self-moving device according to claim 18, wherein the storage unit stores information of several expected locations, the control module is further configured to choose one of the several expected locations, and control the moving module to actuate the self-moving device to move toward the chosen expected location.

20. The self-moving device according to claim 18, wherein the control module is further configured to control the moving module to actuate the self-moving device to move toward the expected location directly, if the quality does not satisfy the preset condition.

21. A self-moving device, comprising:
a moving module, a task execution module, and a control module, wherein the control module is electrically connected to the moving module and the task execution module, and is configured to control the moving module to actuate the self-moving device to move, and to control the task execution module to execute a working task;
the self-moving device further comprises a satellite navigation apparatus, electrically connected to the control module and configured to receive a satellite signal and output current location information of the self-moving device;
wherein the control module is further configured to:
control the moving module to actuate the self-moving device to move along a preset path;
determine whether quality of location information output by the satellite navigation apparatus at a current location satisfies the preset condition, and if the quality does not satisfy the preset condition, control the moving module to actuate the self-moving device to continue to move along the preset path; and
if the quality still does not satisfy the preset condition after the self-moving device moves along the preset path for a preset time or by a preset distance, control the moving module to actuate the self-moving device to leave the preset path, to enable quality of location information output by the satellite navigation apparatus at a location after the movement to satisfy the preset condition.

22. A self-moving device, comprising:
a moving module, a task execution module, and a control module, wherein the control module is electrically connected to the moving module and the task execution module, and is configured to control the moving module to actuate the self-moving device to move, and to control the task execution module to execute a working task;
the self-moving device further comprises a satellite navigation apparatus, electrically connected to the control module and configured to receive a satellite signal and output current location information of the self-moving device; and
wherein the control module is further configured to:
determine whether quality of location information output by the satellite navigation apparatus at a current location satisfies the preset condition, and if the quality does not satisfy the preset condition while the self-moving device moves along a preset path for a preset time or by a preset distance, control the moving module to actuate the self-moving device to leave the preset path, to enable quality of location information output by the satellite navigation apparatus at a location after the movement to satisfy the preset condition, and if the quality does satisfy the preset condition while the self-moving device moves along the preset path within the preset distance or the preset time, the self-moving device is controlled to continue to move along the preset path.

* * * * *